Patented Feb. 27, 1951

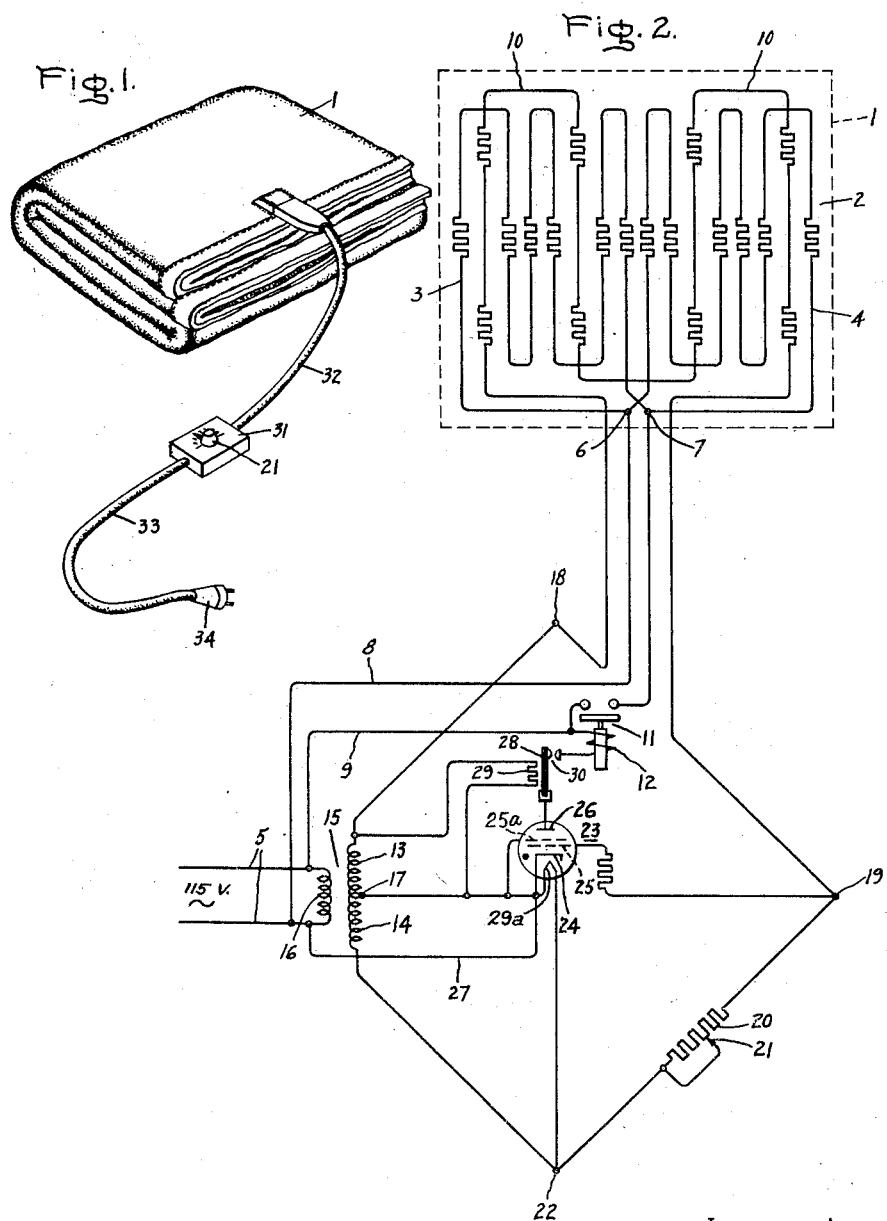

2,543,620

UNITED STATES PATENT OFFICE 2,543,620

ELECTRIC BLANKET CONTROL

Harry C. Anderson and Kenneth T. Sutton, Stratford, Conn., assignors to General Electric Company, a corporation of New York Application January 9, 1946, Serial No. 639,992

5 Claims. (Cl. 219—46)

1

This invention relates to electric blankets, and it has for its object the provision in a device of this character of improved means for controlling the heating circuit there.

This invention contemplates an improved control for an electric blanket for protecting it against overheating in case the blanket is folded or rolled, either while in use or while not in use but inadvertently plugged into the supply source, and in such manner as to produce an abnormally high temperature therein under normal operating voltage conditions.

It has been the practice heretofore to protect the blanket under such conditions by locating within the blanket body a number of thermostats which are connected in the heating circuit of the blanket so as to interrupt this circuit in response to predetermined abnormally high blanket temperatures. This protection is not complete because the thermostats cannot be everywhere, and it is possible under extreme conditions to cover up a part of the blanket and cause overheating in spite of the thermostats because the thermostats themselves are not in the zone of the greatest heat. This invention contemplates an improved control system for protecting the blanket which does not require the use of such thermostats, and which protects all parts of the blanket.

Furthermore, the control system of this invention functions not only to protect the blanket against accidental overheating, but it also functions responsively to ambient temperature changes to cycle the blanket heating circuit "on" and "off" as the ambient temperature falls and rises so as to hold a substantially uniform temperature in the blanket.

In carrying out our invention, we place in thermal relation with the blanket body a "feeler" element which feels, so to speak, the blanket temperature. This element is distributed through the blanket body so as to respond to the temperatures of the greater part of the blanket area. This feeler element has an electrical resistance which varies widely with temperature changes; and we provide suitable means for controlling the heating element of the blanket responsively to the resistance changes in the feeler element so as to shut off the blanket heat when the resistance varies in one direction from a critical value by a predetermined amount, and to reapply the heat when it changes from the critical value by a predetermined amount in the other direction.

In one form of this invention we control the

2 blanket heating element by means of an electron discharge device having its output or anode-cathode circuit arranged to control the heating element of the blanket, and its controlling grid controlled in accordance with the resistance changes in the feeler circuit whereby the output circuit current is varied in such manner as to control the temperature of the blanket.

For a more complete understanding of this invention, reference should be had to the accompanying drawing in which Fig. 1 illustrates an electrically heated blanket embodying this invention; and Fig. 2 is a diagrammatic representation of the blanket together with the control means therefor arranged in accordance with this invention.

Referring to the drawing, this invention has been shown in one form as applied to on electrically heated blanket provided with a flexible blanket body 1 to which is applied heating means 2 consisting of a pair of flexible resistance conductors 3 and 4 connected together in parallel and energized from a suitable source of alternating current supply 5, the opposite sides of which are connected to the blanket terminals 6 and 7 by means of conductors 8 and 9. The resistance conductors 3 and 4 are arranged into a number of convolutions covering the respective halves of the blanket, as shown in Fig. 2. It will be understood that the blanket body will be provided with suitable channels (not shown) in which the resistance conductors 3 and 4 are threaded. Preferably, a blanket body such as described and claimed in the United States patent to I. O. Moberg No. 2,203,918, dated June 11, 1940 will be used.

In order to control the energization of the heating means 2 so as to prevent overheating in the blanket, and so as to cycle the heating means between energized and deenergized conditions to hold a substantially uniform temperature, we provide a feeler element 10 which also is threaded through suitable channels provided for it in the blanket body 1. This element, as shown, is also formed into a plurality of convolutions.

This feeler element is made of a flexible resistance material, the resistance of which varies widely with temperature changes; we prefer to use such a material whose resistance increases rapidly with increases in the temperature. It may be formed of any suitable resistance material, such as nickel, or iron, or a suitable alloy of nickel, iron and copper. It should be noted that the heating effect of this element with respect to the blanket body is substantially negligible.

Suitable means are provided for controlling the energization of the heating means 2 responsively to changes in the resistance of the feeler circuit 10 as the blanket temperature varies. This means comprises a relay 11 connected in series with the conductor 9 leading from one side of the supply source 5 to the terminal 7 of the heating means 2. The operating coil 12 of this relay is controlled by means of a Wheatstone bridge having four impedances. Two of these impedances 13 and 14 are the secondary windings of a transformer 15 which has a primary winding 16 connected across the supply source 5, as shown. The two windings 13 and 14 are connected together to form a midpoint 17 which is the juncture point between the two legs of the bridge including the windings 13 and 14. The third leg of this bridge is defined by the feeler resistance 10, one terminal of which, as shown, is connected to the terminal 18 of the bridge which terminal also is connected to the secondary winding 13, as shown. The other terminal of the feeler circuit 10 is connected to the bridge terminal 19, which is the juncture point between the third leg and the fourth leg of the bridge defined by an adjustable resistance 20, this resistance, as shown, having an adjustable contact 21. The numeral 22 indicates the junction point between the fourth leg of the bridge and the second leg thereof which includes the secondary winding 14.

The control system further comprises an electron discharge device 23 which preferably will be a tetrode; as shown, it is provided with a cathode 24, a control grid 25 and a shield grid 25a, and also with an anode 26. The anode-cathode circuit of the discharge device, which circuit is the output circuit of this control device, includes a conductor 27 connected with the lower conductor of the supply source 5, a thermal safety device 28, the operating coil 12 of the contactor and the conductor 9 which is connected with the upper conductor of the supply source 5. The grid-cathode circuit is connected across the terminal points 17 and 19 of the bridge, as clearly shown. The thermal device 28 is provided with a heater 29 which is energized by the secondary winding 13 of the transformer. The filament 29a of the discharge device is connected across the secondary winding 14, as shown.

In the operation of electron discharge devices of this character, it will be understood that the flow of current in the anode circuit will be controlled by the potential of the grid. It will be assumed for the purpose of illustration that the device 23 is one having a zero control grid voltage, that is, one wherein if the control grid voltage is zero or positive then the device will pass current, that is, it will "fire," on each positive half cycle, whereas if the grid voltage is negative then the tube will not fire. It will be understood that the voltage of the grid circuit across the points 17 and 19 will be positive or negative depending upon the relative value of the resistance in the feeler circuit 10 and of the adjustable resistance 20. If the feeler circuit resistance is lower than is the resistance 20 then the voltage between the points 17 and 19 is positive with respect to the cathode and the tube will fire every positive half cycle. But if the resistance of the feeler circuit becomes greater than the resistance 20 then the grid voltage between the points 17 and 19 goes down and becomes more negative with respect to the cathode and at some predetermined low value of the resistance in the feeler circuit this voltage will have become sufficiently negative so that the tube will not fire. If the value of the resistance of the feeler circuit again rises above this predetermined value then the tube will fire again.

It will be further understood that when the discharge device 23 is passing current on each positive half cycle it will energize the coil 12 of the relay 11 so as to close this relay and thereby energize the heater circuit 2, whereas when it does not pass current it will deenergize the relay and permit it to open thereby to deenergize the heating circuit.

The protective thermal device 28 is heated by its heater 29 when the blanket is first energized so as to close its contacts 30 and thereby close a circuit through the safety device to the coil 12 in a predetermined time interval. This is interposed in the system for the purpose of protecting the discharge device 23 which should not be connected to the load circuit before its filament 24 is heated up. Usually the filament will heat up in five or ten seconds and the heater 29 is set so as to heat the thermal device 28 to close only after this time interval.

In the operation of the blanket, it will be understood that when the blanket is first plugged into its supply source, the tube will heat up and then the protective device 28 will close its contacts 30. Inasmuch as the resistance of the feeler circuit 10 is now relatively low as compared with that of the resistance 20 the discharge device 23 will fire every half cycle, and therefore will pass current through the coil 12 of the relay to cause it to close and thereby energize the heating resistances 3 and 4. The resistances 3 and 4 will heat up and eventually will heat the blanket body to the desired operating temperature. Should the blanket tend to heat up much beyond the desired temperature the resistance in the feeler circuit 10 will rise sufficiently high with relation to the resistance 20 so as to reduce the positive voltage in the grid circuit with respect to the cathode, and at a predetermined resistance in the feeler circuit, corresponding to a predetermined high temperature, it will reduce this voltage sufficiently to render the device 23 non-conducting, and as a result the operating coil 12 of the relay 11 will be deenergized, whereby it will open and deenergize the heating means. When the blanket temperature falls as a result of this, the resistance in the feeler circuit will fall and eventually it will become so low with relation to the resistance 20 that the voltage in the grid circuit will again rise and become positive with respect to the cathode and the tube again will fire every half cycle; this operation will reenergize the relay to cause it to reenergize the heater. In this fashion, the system will cycle between "on" and "off" points for the heater to hold a substantially uniform temperature.

Should the ambient temperature fall, the blanket body temperature will fall and as a result it will require more time to heat the element 10 to raise its resistance to the value at which it will cause the tube 23 to stop "firing" and thereby deenergize the heater means 2 than it did before; and likewise it will cool down more quickly to cause the tube to fire again to reenergize the blanket. In this way, the control will function to lengthen the heating part of the cycles so as to hold the desired blanket temperature in spite of the drop in the ambient. Conversely, should the ambient temperature rise, the control will function to shorten the heating portion of the cycles so as to hold the desired temperature.

Sometimes, parts of the blanket become folded while it is being used, and at other times it happens that the blanket is left energized when not in use and then is folded; or it happens at times that a part of the blanket is covered up as by means of a pillow. In such circumstances, it is possible that some part or other of the blanket will overheat. This area of the blanket which is shielded or prevented from dissipating its heat will elevate the temperature of the feeler circuit in that part of the blanket which will increase the total resistance of this circuit. Before an abnormally dangerously high temperature condition can be attained this resistance will rise sufficiently high with relation to the resistance 20 as to cause the discharge device 23 to cease passing current which operation will deenergize the heating means in the manner described above. The entire blanket will then cool down to a safe value and the resistance of circuit 10 again will fall to permit the electron discharge device 23 to again pass current to reenergize the blanket, but again the system will function to deenergize the heater before an excessively high temperature can be reached in any part of the blanket. The cycles of operation under these conditions, of course, will be very long because the blanket will heat and cool gradually.

It will be observed, therefore, that the control system of this invention functions not only to regulate the heat for normal blanket operation, but also functions as a safety device to cut off the heat.

It will be understood that the temperature held in the blanket can be changed by adjusting the resistance 20 by shifting its adjustable contact 21. This operation, of course, will vary the effective resistance of resistance 20 with relation to that in the feeler circuit 10, and thereby change the resulting temperature held in the blanket. Thus, if the resistance 20 be reduced, this will be equivalent to raising the value of the resistance in the feeler circuit 10, and the resulting blanket temperature will be reduced. Conversely, if the resistance 20 be increased, the blanket temperature will be increased.

Preferably, the contactor 11, the transformer 15, the resistance 20 and electron discharge device 23 all will be mounted in a suitable single housing or casing 31 which casing will be connected with the blanket through a common cord 32 which includes the conductors 8 and 9 and the two which function to connect the feeler circuit 10 with the bridge, while a suitable twin supply cord 33 will connect the primary 16 of the transformer 15 with the source of supply 5 through a suitable twin supply plug 34.

While we have shown and described a particular embodiment of our invention, it will be obvious to those skilled in the art that various changes and modifications may be made without departing from our invention in its broader aspects and we therefore aim in the appended claims to cover all such changes and modifications as fall within the true spirit and scope of our invention.

What we claim as new and desire to secure by Letters Patent of the United States is:

1. An electric blanket comprising a flexible blanket body, a heating element distributed through a selected area of said body for heating the same, a feeler element also distributed through said body area characterized by an electrical resistance which varies widely with temperature changes, an electron discharge device provided with input and output circuits, a source of alternating current supply for the output circuit, means responsive to variations in the resistance of said feeler circuit for causing an electromotive force to be applied to said input circuit varying in polarity in accordance with said temperature changes whereby the current in said output circuit is varied, and a control device for controlling said heating element to control the temperature in said blanket body responsively to the current in said output circuit.

2. An electric blanket comprising a flexible blanket body, a heating resistance element distributed through said body for heating it, a feeler element separate from said resistance element and also distributed through said body, said element having a resistance which changes rapidly with temperature changes, an electron discharge device provided with a cathode, an anode and a controlling grid, control means for said heating element connected in circuit with the anode-cathode circuit of said device so as to respond to the magnitude of the current thereof and thereby control said heating element to control the temperature in said blanket body, and means for applying a positive or a negative potential to said grid in accordance with the resistance of said feeler element so as to control the magnitude of the current in said anode-cathode circuit and thereby control said control means.

3. An electric blanket comprising a flexible blanket body, a heating element distributed through a selected area of said blanket body for heating the same, a source of alternating current supply for said heating element, a transformer having a primary winding connected to said supply source and a pair of secondary windings connected together to give a midpoint, said two secondary windings constituting the two legs of a Wheatstone bridge, said bridge also provided with a third leg having a resistance element also distributed through said blanket area and characterized by a resistance which varies widely with temperature changes, and the bridge being completed by a fourth leg including an adjustable resistance for temperature preselection, and a polarized control element for controlling the energization of said heating element connected to said bridge so as to energize said heating element by bridge unbalance resulting from a temperature below said preselected temperature.

4. An electric blanket comprising a flexible blanket body, a heating element distributed through a selected area of said blanket body, a source of alternating current supply for said heating element, a transformer having a primary winding connected to said supply source and a pair of secondary windings connected together to give a midpoint, said two secondary windings constituting the two legs of a Wheatstone bridge, said bridge also provided with a third leg having a resistance element also distributed through said blanket area and characterized by a resistance which varies widely with temperature changes, and the bridge being completed by a fourth leg including an adjustable resistance for temperature preselection, an electron discharge device provided with an anode, a cathode and a controlling grid, a circuit including said anode and cathode energized from said alternating current supply source, a circuit including said grid and cathode connected to said midpoint and to the junction point between said third and fourth legs, and a control element for controlling the energization of said heating element connected in said anode-cathode circuit so as to be controlled by the magnitude of the current therein to maintain said preselected temperature.

5. An electric blanket comprising a flexible blanket body, a heating element distributed through a selected area of said blanket body, a source of alternating current supply for said heating element, a transformer having a primary winding connected to said supply source and a pair of secondary windings connected together to give a midpoint, said two secondary windings constituting the two legs of a Wheatstone bridge, said bridge also provided with a third leg having a resistance element also distributed through said blanket area and characterized by a resistance which varies widely with temperature changes, and the bridge being completed by a fourth leg including an adjustable resistance, an electron discharge device provided with an anode, a cathode and a controlling grid, a circuit including said anode and cathode energized from said alternative current supply source, a circuit including said cathode and grid connected to said midpoint and to the junction point between said third and fourth legs, and a control relay for controlling the energization of said heating element energized by the current in said anode-cathode circuit.

HARRY C. ANDERSON.
KENNETH T. SUTTON.

REFERENCES CITED

The following references are of record in the file of this patent:

UNITED STATES PATENTS

| Number | Name | Date |
|---|---|---|
| 1,694,264 | Hull | Dec. 4, 1928 |
| 1,979,467 | Hellmuth | Nov. 6, 1934 |
| 1,994,076 | Kuhle et al. | Mar. 12, 1935 |
| 1,997,011 | O'Donovan | Apr. 9, 1935 |
| 2,086,966 | Shrader | July 13, 1937 |
| 2,112,080 | Eames | Mar. 22, 1938 |
| 2,126,398 | Knowles | Aug. 9, 1938 |
| 2,163,297 | Waage | June 20, 1939 |
| 2,189,462 | Donle et al. | Feb. 6, 1940 |
| 2,203,918 | Moberg | June 11, 1940 |
| 2,278,633 | Bagnall | Apr. 7, 1942 |

FOREIGN PATENTS

| Number | Country | Date |
|---|---|---|
| 144,669 | Great Britain | Sept. 9, 1921 |
| 338,880 | Great Britain | Nov. 18, 1930 |
| 436,009 | Germany | Oct. 21, 1926 |